Nov. 12, 1929.　　C. R. MARTIN ET AL　　1,735,690
SYSTEM OF DISTRIBUTION
Filed Nov. 12, 1925
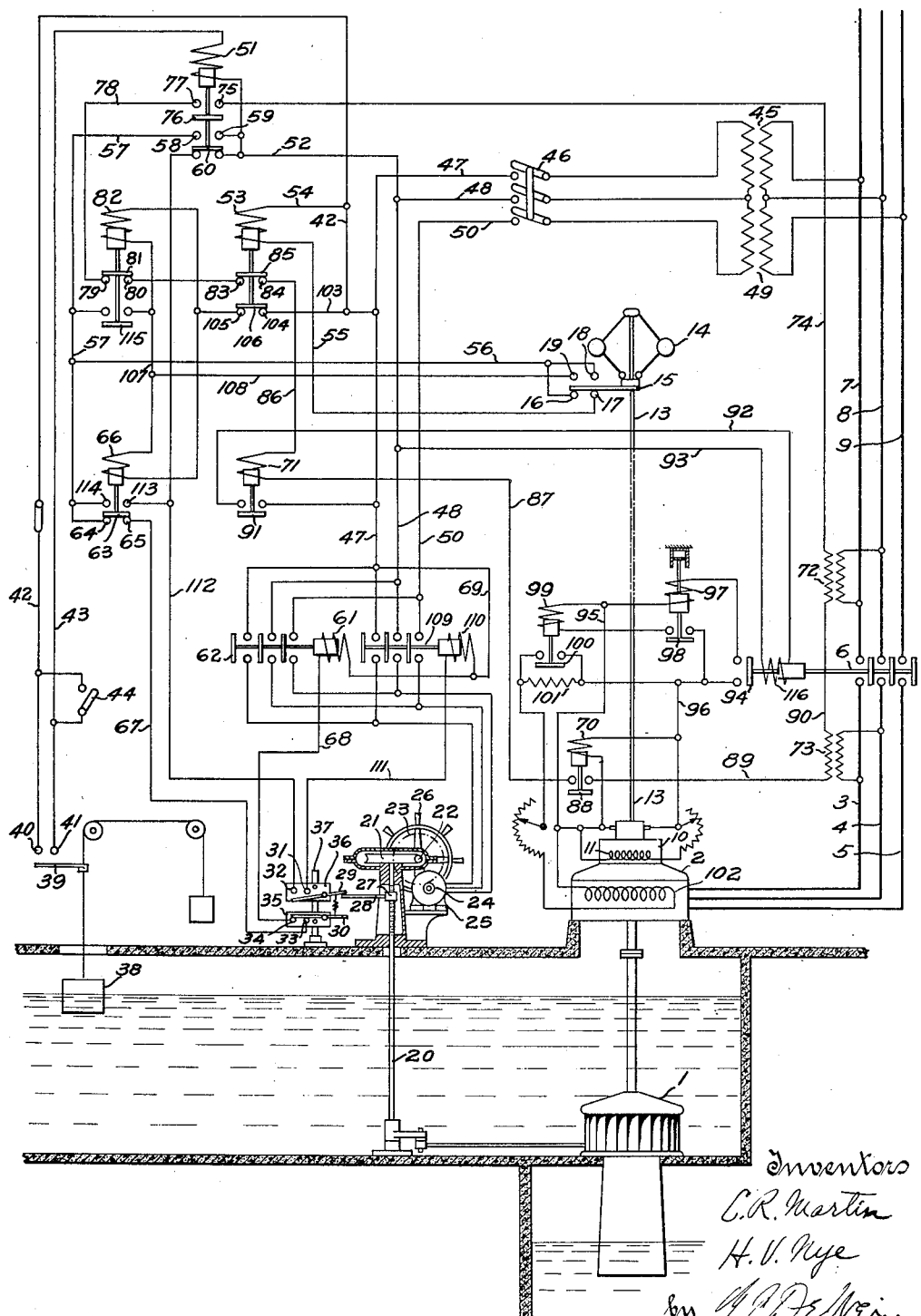

Patented Nov. 12, 1929

1,735,690

UNITED STATES PATENT OFFICE

CHARLES R. MARTIN, OF WAUWATOSA, AND HENRY V. NYE, OF WEST ALLIS, WISCONSIN, ASSIGNORS TO ALLIS-CHALMERS MANUFACTURING COMPANY, OF MILWAUKEE, WISCONSIN, A CORPORATION OF DELAWARE

SYSTEM OF DISTRIBUTION

Application filed November 12, 1925. Serial No. 68,649.

This invention relates to systems of distribution and more particularly to systems involving a prime mover dynamo plant.

One of the objects of the invention is to provide a prime mover dynamo plant which may be automatically started and controlled. Another object is to provide a prime mover dynamo plant in which the usual form of governor has been eliminated. Still another object is to provide a governorless prime mover dynamo plant which is controlled by the speed of the prime mover. A further object is to provide a prime mover dynamo plant the prime mover of which may be controlled by an electromotive device, and also in which the sequence of operations will be reliably and efficiently performed. A more specific object is to prevent improper sequence of operations of the various elements of the system, and more specifically to prevent the dynamo from being connected to the line until the prime mover has reached a predetermined speed and phase; to prevent improper operation of the means for admitting operating fluid to the prime mover and particularly with respect to the speed of the prime mover; and to provide other interlocks as will appear hereinafter. Other objects will appear hereinafter as the description of the invention proceeds.

The novel features of the invention will appear from this specification and the accompanying drawing forming a part thereof and showing one embodiment of the invention and all these novel features are intended to be pointed out in the claims.

The single figure of the drawing is a diagrammatic showing of the invention as it may be applied in connection with a hydroelectric installation.

Referring to the drawing, a hydraulic turbine 1 is adapted to drive an alternating current generator 2 provided with a field winding 102. The generator 2 may be connected to buses 3, 4, 5, and, by means of a circuit breaker 6, to feeders 7, 8, 9. The generator is here shown as provided with a direct-connected exciter 10 having a field winding 11. A centrifugally responsive device 14 is here shown as connected to the exciter through a shaft 13 so that said device will be responsive to the speed of the generator and prime mover. It is of course clear that the connection between said device and the generator or prime mover may be of any other desired form. The centrifugally responsive device 14 has associated therewith a movable contact 15 which, when the speed is below a predetermined amount is adapted to bridge a pair of relatively stationary contacts 16, 17. When the speed rises above a predetermined amount contact 15 is adapted to bridge another pair of contacts 18, 19.

The guide vanes of the turbine 1 or any other desired means for controlling the admission of water or operating fluid to the turbine or prime mover may be controlled by means of a shaft 20 which may be rotated by means of a worm wheel 21 and a worm 22. The worm 22 is here shown as rotatable by means of a gear 23 in turn driven by a pinion 24 associated with a motor 25 which may be of the three-phase induction type or any other suitable type. If desired the worm 22 may also be rotated by means of a hand wheel 26. The shaft 20 is here shown as threaded on a portion of its length and adapted to reciprocate a threaded nut 27 carrying a switch operating finger 28. When the installation is at rest and the gates of the turbine are closed the finger 28 is in the position shown in the drawing in which it engages a switch 29 thereby holding switch 29 out of contact with a pair of relatively stationary contacts 31, 32. When the finger 28 is moved downwardly switch 29 closes. Further movement of the finger in the downward direction causes it to engage a switch 30 which thereby disengages a pair of contacts 33, 34. The switches 29, 30 may be biased to their closed positions in any suitable manner as by means of a spring connecting the switch arms as shown. The switches 29, 30 along with their relatively stationary contacts may be mounted on blocks 35, 36 respectively which blocks are slidably mounted on a rod 37 and may be fastened in any desired position on said rod, in order that either of the switches may be caused to open when the shaft 20 or the gates are in any desired position.

If it is desired that the prime mover be started in response to the supply of water a float 38 which is controlled by the level of the water may be provided. The float 38 is shown as controlling a contact 39 which, when the water level rises sufficiently, is adapted to make contact with a pair of contacts 40, 41 connected respectively to the control conductors 42, 43. If it is desired to start the installation manually a control switch 44 adapted to bridge the control conductors may be provided.

As will appear hereinafter certain of the control circuits and devices may be fed from a transformer 45 here shown as connected to the feeders 7, 8. Current may be supplied from transformer 45 to a pair of conductors 47, 48 through a switch 46. Another transformer 49 here shown as connected to feeders 8, 9 may be connected in three-phase relation with transformer 45 and supply current through switch 46 to conductor 50 along with conductors 47, 48. A master relay 51 has one terminal of its operating coil connected to conductor 43 and the other through a conductor 52 to conductor 48. Conductor 42 is connected to conductor 47 so that when either switch 44 or switch 39 is closed, relay 51 will be energized.

The connections of the system will be best understood from a description of the operation thereof. Assuming that switch 46 is closed so that the various control devices may be supplied with current and that switch 44 is closed, master relay 51 will be energized.

This causes energization of a relay 53 through a conductor 54, a conductor 55, contacts 16, 17 of the centrifugal switch which is closed because the prime mover is at rest, a conductor 56 connected to a conductor 57 in turn connected to a contact 58, through a movable relay contact 60 which has been lifted by energization of relay 51, through a relatively stationary relay contact 59 to a conductor 52 connected to the conductor 48. Simultaneously with the energization of relay 53 an operating coil 61 of a motor control switch 62 is energized as follows. From conductor 48 through contacts 59, 60, 58, conductor 57 through relatively stationary contacts 64, 65 and a movable contact 63 of a relay 66, through switch 30, through a conductor 68, through coil 61, through a conductor 69 which is connected to supply conductor 47. The closure of motor control switch 62 connects motor 25 to the three-phase line 47, 48, 50 so that motor 25 will rotate in the proper direction to cause the gates of the turbine to move toward the open position. The turbine 1 therefore will start and the speed thereof along with that of the generator and exciter will rise. If the exciter voltage comes up properly when a predetermined speed has been reached, a voltage responsive relay 70 which is connected across the exciter terminals will be effectively energized thereby lifting a movable contact 88 to partially close a circuit as will hereinafter appear.

The closure of contact 88 renders the energization of a circuit breaker control relay 71 possible when a pair of potential transformers 72, 73 are in phase as will more fully appear. The transformer 72 has one of its windings connected to the feeders 7, 8 and the transformer 73 has one of its windings connected to the buses 3, 4.

When the gates of the turbine have opened a predetermined amount and the prime mover has come up to a predetermined speed, the switch 15 will be disengaged from contacts 16, 17 thereby deenergizing relay 53 This closes a circuit through circuit breaker control relay 71 as follows. From one terminal of transformer 72 through a conductor 74 through a relatively stationary contact 75 of relay 51, a movable contact 76 thereof, a stationary contact 77 thereof, through a conductor 78, through a pair of relatively stationary contacts 79, 80 and a movable contact 81 of a relay 82 which is deenergized at this time, through a pair of relatively stationary contacts 83, 84 and a movable contact 85 of the relay 53, through a conductor 86, through relay 71, through a conductor 87, through contact 88, through a conductor 89, to one terminal of transformer 73 and from the other terminal of that transformer to the other terminal of transformer 72. If transformers 72, 73 are in phase relay 71 will be effectively energized to thereby lift a movable contact 91 thereby closing a circuit from conductor 47 through a conductor 92 through an operating coil 116 through a conductor 93, to conductor 48. The energization of coil 116 is adapted to close circuit breaker 6 thereby connecting generator 2 to the feeders 7, 8, 9.

When circuit breaker 6 closes, an auxiliary contact 94 associated therewith is adapted to close a circuit from a pair of conductors 95, 96 leading from exciter terminals, through a time limit relay 97. After a predetermined time a movable contact 98 of relay 97 closes a circuit for a contact or relay 99 fed from conductors 95, 96. A movable contact 100 of the relay 99 is thereby caused to bridge a resistance 101 which has been until this time in series with the field winding 102 of the generator. The generator is therefore supplied with full field. The field current may be adjusted in the usual manner by rheostats in series with the field and after adjustment may be left in the adjusted position, the unit being left to operate automatically otherwise. The motor 25 continues to operate until the finger 28 opens the contact 30 at which time the gate to the prime mover is opened either fully or to a desired predetermined extent.

Should the speed of the unit rise to a predetermined extent above synchronous speed, the contact 15 bridges the contacts 18, 19 thereby energizing relay 82, through a conductor 103, stationary contacts 104, 105 of relay 53 bridged by contact 106 of said relay coil 82, a conductor 108, contacts 19, 18, conductors 56, 57, contacts 58, 60, 59 of relay 51 to supply conductor 48. The energization of relay 82 deenergizes circuit breaker control relay 71 by reason of the opening of contact 81 and the circuit breaker 6 therefore opens. The relay 82 is held open by the closure of a bypass contact 115 thereby feeding the coil 82 as will be clear directly from conductors 47, 48 through relay contacts 60 and 106. Simultaneously with the energization of relay 82 relay 66 is energized. The energization of relay 66 causes closure of a motor control switch 109 through energization of an operating coil 110 therefor, through the following circuit: conductor 47, coil 110, a conductor 11, limit switch 29, a conductor 112, a pair of upper contacts 113, 114 of relay 66 bridged by contact 63, contacts 58, 60, 59, to conductor 48. The motor 25 therefore, by reason of the reversal of connections thereto from the three-phase lines 47, 48, 50, moves the gate toward the closed position and the turbine speed therefore falls. When the speed reaches a predetermined amount the contact 15 bridges contacts 16, 17 thereby energizing relay 53 through a circuit which may be readily traced. The energization of relay 53 deenergizes relay 66 and as will be clear a motor control switch 109 opens and the motor control switch 62 closes by reason of energization of coil 61 The turbine gate therefore again begins to move toward the open position and the mode of operation is then the same as already described for the sequence of starting operations, the generator being eventually again connected to the system. Simultaneously with deenergization of relay 66 relay 82 is also deenergized this making it possible to again energize the circuit breaker control relay 71.

If while the system is in operation and it is desired to disconnect the generator and stop the prime mover generator unit, the circuit of the master relay 51 may be opened in any suitable manner, as by opening of contact 39, or some other switch in series with relay 51, thereby deenergizing all control relays and consequently also opening circuit breaker 6. The deenergization of master relay 51 energizes operating coil 110 thereby closing motor control switch 109 to cause the turbine gate to close. The coil 110 is energized through the following circuit: conductors 48, 52, contact 60 in the position shown, conductor 112, limit switch 29, conductor 111, operating coil 110, conductor 69, to conductor 47. The motor 25 operates until the gates are closed at which time the control switch 29 opens thereby stopping the motor.

It should be understood that it is not desired to limit the claims to the exact details of construction shown and described, for obvious modifications may occur to persons skilled in the art.

It is claimed and desired to secure by Letters Patent:

1. In a system of distribution, a prime mover generator unit, a gate for admitting operating fluid to said prime mover, a motor for operating said gate, a control switch, means whereby closure of said control switch causes said motor to operate and move said gate toward open position, a circuit breaker, means actuated in response to a rise in speed of said prime mover to a value a predetermined amount below synchronous speed, means responsive to the relative phases of said generator and distribution system, means responsive jointly to said speed responsive and phase responsive means for causing said circuit breaker to connect said generator to said distribution system, and means for stopping said motor when said gate has been opened a predetermined amount.

2. In a system of distribution, a prime mover generator unit, a gate for admitting operating fluid to said prime mover, a motor for operating said gate, a control switch, means whereby closure of said control switch causes said motor to operate and move said gate toward open position, a circuit breaker, means responsive to the speed of said prime mover for causing said circuit breaker to close and connect said generator to said distribution system and for causing said circuit breaker to open in response to a predetermined drop in speed of said prime mover, and means for stopping said motor when said gate has been opened a predetermined amount.

3. In a system of distribution, a prime mover generator unit, a gate for admitting operating fluid to said prime mover, a motor for operating said gate, a control switch, means whereby closure of said control switch causes said motor to operate and move said gate toward open position, a circuit breaker, means responsive to the speed of said prime mover for causing said circuit breaker to close and connect said generator to said distribution system, means for stopping said motor when said gate has been opened a predetermined amount, and means responsive to a predetermined rise in speed of said prime mover for causing said circuit breaker to open.

4. In a system of distribution, a prime mover generator unit, a gate for admitting operating fluid to said prime mover, a motor for operating said gate, a control switch, means whereby closure of said control switch causes said motor to operate and move said gate toward open position, a circuit breaker, means responsive to the speed of said prime mover for causing said circuit breaker to close and connect said generator to said distribution system, means for stopping said motor when said gate has been opened a predetermined amount, and means responsive to a predetermined rise in speed of said prime mover for causing said motor to operate said gate toward closed position.

5. In a system of distribution, a prime mover generator unit, a gate for admitting operating fluid to said prime mover, a motor for operating said gate, a control switch, means whereby closure of said control switch causes said motor to operate and move said gate toward open position, a circuit breaker, means responsive to the speed of said prime mover for causing said circuit breaker to close and connect said generator to said distribution system, means for stopping said motor when said gate has been opened a predetermined amount, means responsive to a predetermined rise in speed of said prime mover for causing said motor to operate said gate toward closed position thereby causing the prime mover speed to fall, and means responsive to a predetermined drop in said speed for reversing said motor and causing it to move said gate toward open position.

6. In a system of distribution, a prime mover generator unit, a gate for admitting operating fluid to said prime mover, a motor for operating said gate, a control switch, means whereby closure of said control switch causes said motor to operate and move said gate toward open position, a circuit breaker, means responsive to the speed of said prime mover for causing said circuit breaker to close and connect said generator to said distribution system, means for stopping said motor when said gate has been opened a predetermined amount, means responsive to a predetermined rise in speed of said prime mover for causing said circuit breaker to open and for causing said motor to operate and move said gate toward closed position thereby causing said prime mover speed to fall.

7. In a system of distribution, a prime mover generator unit, a gate for admitting operating fluid to said prime mover, a motor for operating said gate, a control switch, means whereby closure of said control switch causes said motor to operate and move said gate toward open position, a circuit breaker, means responsive to the speed of said prime mover for causing said circuit breaker to close and connect said generator to said distribution system, means for stopping said motor when said gate has been opened a predetermined amount, means responsive to a predetermined rise in speed of said prime mover for causing said circuit breaker to open and for causing said motor to operate and move said gate toward closed position thereby causing said prime mover speed to fall, and means responsive to a predetermined drop in said speed for reversing said motor and causing it to move said gate toward open position.

8. In a system of distribution, a prime mover generator unit, a gate for admitting operating fluid to said prime mover, a motor for operating said gate, a control switch, means whereby closure of said control switch causes said motor to operate and move said gate toward open position, a circuit breaker, means responsive to the speed of said prime mover for causing said circuit breaker to close and connect said generator to said distribution system, means for stopping said motor when said gate has been opened a predetermined amount, means responsive to a predetermined rise in speed of said prime mover for causing said circuit breaker to open and for causing said motor to operate and move said gate toward closed position thereby causing said prime mover speed to fall, means responsive to a predetermined drop in said speed for reversing said motor and causing it to move said gate toward open position, and means for reclosing said circuit breaker in response to a consequent predetermined rise in speed.

In testimony whereof, the signatures of the inventors are affixed hereto.

CHARLES R. MARTIN.
HENRY V. NYE.